US006099626A

United States Patent [19]

Hirano et al.

[11] Patent Number: 6,099,626

[45] Date of Patent: *Aug. 8, 2000

[54] RECORDING SUBSTANCE AND MANUFACTURING METHOD THEREOF, RECORDING METHOD AND RECORDING APPARATUS

[75] Inventors: Hideki Hirano; Kenji Shinozaki, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/501,930

[22] Filed: Jul. 13, 1995

[30] Foreign Application Priority Data

Jul. 14, 1994 [JP] Japan .................................... 6-185368

[51] Int. Cl.⁷ .................................................... C09D 11/02

[52] U.S. Cl. ..................................... 106/31.32; 106/31.64

[58] Field of Search .............................. 106/31.32, 31.64

[56] References Cited

U.S. PATENT DOCUMENTS

| | | | |
|---|---|---|---|
| 4,683,002 | 7/1987 | Mirua et al. | 106/31.32 |
| 4,732,613 | 3/1988 | Shioya et al. | 106/31.32 |
| 4,867,789 | 9/1989 | Eida et al. | 106/31.32 |
| 5,139,598 | 8/1992 | Chou et al. . | |
| 5,358,558 | 10/1994 | Yamamoto et al. | 106/31.58 |
| 5,584,918 | 12/1996 | Suzuki et al. | 106/31.32 |
| 5,605,566 | 2/1997 | Yui et al. | 106/31.32 |
| 5,637,138 | 6/1997 | Yamazaki | 106/31.32 |
| 5,637,140 | 6/1997 | Fujioka | 106/31.35 |
| 5,645,630 | 7/1997 | Yamazaki | 106/31.32 |
| 5,656,072 | 8/1997 | Kato et al. | 106/31.58 |
| 5,755,861 | 5/1998 | Fujioka et al. | 106/31.32 |

*Primary Examiner*—Helene Klemanski
*Attorney, Agent, or Firm*—Hill & Simpson

[57] ABSTRACT

In a recording substance (ink 22) supplied to transfer to a body to be recorded on (printing paper 50) and effect prescribed recording on this body to be recorded on, the content of residual impurities which after the recording do not transfer to the body to be recorded on and remain is made less than 2wt %. As a result, the occurrence of residual impurities (residual solids) produced on the head during recording is prevented, the influences of such residual impurities are avoided and high quality recording with excellent sensitivity and tonal reproducibility is always obtained.

2 Claims, 9 Drawing Sheets transfer test apparatus sublimation refining apparatus

RECORDING SUBSTANCE AND MANUFACTURING METHOD THEREOF, RECORDING METHOD AND RECORDING APPARATUS

BACKGROUND OF THE INVENTION

This invention relates to a recording substance and a manufacturing method therefor and a recording method and a recording apparatus (especially a laser beam printer) using this recording substance.

In recent years, the demand for the ability to record not only of course monocolor but also color hard copies of images from video cameras, television and computer graphics and the like has been increasing. Printers using various different recording methods have been developed in response to this and are being deployed in various fields.

Among these recording methods there is one wherein an ink sheet coated with an ink layer consisting of a high density ink dispersed in a suitable binder resin and a body to be transferred onto such as printing paper coated with an ink-receiving resin which receives transferred ink are brought into contact with a fixed pressures heat corresponding to image information is applied by a thermosensitive recording head positioned over the ink sheet, and ink is thermally transferred from the ink sheet to the ink-receiving layer according to this heating.

The so-called thermal transfer method, wherein full-color images are obtained by the operation described above being repeated for each component of an image signal resolved into for example the three subtractive color mixture primary colors yellow, magenta and cyan, is attracting attention as an excellent technology with which printer downsizing and maintenance are easy, recording is instant, and high quality images as good as silver chloride color photographs can be obtained.

FIG. 1 is a schematic front view of a main part of such a thermal transfer type printer. In this printer, a thermosensitive recording head (hereinafter called a thermal head) 1 and a platen roller 3 face each other, and between these an ink sheet 12 consisting of an ink layer 12*a* on a base film 12*b* and a paper to be recorded on (body to be transferred onto) 20 consisting of an ink-receiving resin layer (ink-receiving layer) 20*a* on a paper 20*b* are pressed against the thermal head 1 in a pinched-together state by the platen roller 3.

Ink (transfer dye) in the ink layer 12*a* selectively heated by the thermal head 1 is transferred in dot form to the ink-receiving resin layer 20*a* of the body to be transferred onto 20, and thermal transfer recording is thereby accomplished. For this kind of thermal transfer recording, generally a line system wherein a long thermal head is disposed orthogonal to the paper travel direction or a serial system wherein a thermal head is moved back and forth in a direction orthogonal to the paper travel direction is employed.

The present applicant has already proposed a non-contact type ink-vaporizing laser beam printer (LBP) of the kind shown in FIG. 2 in order to reduce the amount of waste material produced and the amount of transfer energy used and realize a smaller and lighter printer while making the most of the above-mentioned merits of the thermal transfer recording method.

In this printer, a small space 11 in the range lgm to lmm is provided between a recording head (a printer head) 10 having a thermally melting ink layer 22 in a vaporization part 17 and a body to be recorded on (printing paper) 50 having a receiving layer 50 a for receiving vaporized (or sublimed) ink.

By irradiation with laser light L, liquefied ink 22 held in an ink receptacle 37 of the vaporization part 17 of the recording head 10 is selectively heated to near its boiling point and vaporized, this vaporized ink 32 is caused to fly across the space 11 and transfer through a vaporization hole 23 onto the printing paper 50, and an image having continuous gradation is obtained. By this operation being repeated for each component of an image signal resolved into the three subtractive color mixture primary colors yellow, magenta and cyan, full-color printing can be achieved.

With this recording system, preferably the printing paper 50 is made to face the recording head 10 for example from above and laser light L emitted from a laser 18 and focused by a lens 19 is shone into the vicinity of the upper surface of the ink-vaporization part 17 and causes vaporized ink 32 to fly upward. To move the ink through the space 11 by the heating means, besides the vaporization phenomenon, the phenomenon often seen during irradiation with a high output laser that bonds of ink molecules are efficiently broken and using that energy the substance is etched at an extremely high rate, or the phenomenon wherein the energy of a gas produced by boiling or explosion is used to etch the substance at an extremely high rate can be used (these transfer mechanisms other than the vaporization mechanism are called ablation; likewise hereinafter).

An ink reservoir 15 is provided in a head base 14 transparent to laser light, liquefied ink 22 is held between this and a spacer 28 fixed on the head base 14, and the liquefied ink 22 is supplied from here to the vaporization part 17 through an ink supply passage 27. To increase the supply efficiency of ink to the ink-vaporization part 17 and the vaporizing efficiency, fine projections consisting of thin pillars 21 which use the capillary phenomenon to supply and hold ink are provided in the ink-vaporization part 17.

To maintain the above-mentioned space 11 and guide the a printing paper 50 moving in the X direction , a protecting plate 29 is fixed on top of the spacer 28. A heater 16 for maintaining the liquefied state of the ink is embedded in this protecting plate 29, but this kind of heater can alternatively be disposed inside the ink holding part (the above-mentioned passage 17 and ink reservoir 15 ).

A printer head of this kind for a full-color printer has for example ink reservoirs 15Y, 15M and 15C for yellow, magenta and cyan provided in a common base 14, and from there ink of each color is supplied to rows of vaporization parts 17Y, 17M and 17C each forming 12 to 24 dots of the respective color of ink.

Laser beams emitted by a multi-laser array 30 consisting of twelve to twenty-four lasers (especially semiconductor laser chips) 18 disposed in an array are severally focused into the vaporization part s by a microlens array 31 of converging lenses 19.

As described above, in this ink-vaporizing laser beam printer, by sending just the amount of ink which is consumed in recording in a melted state from the ink reservoir to the vaporization part spontaneously or forcibly, or by ink being continuously coated on a suitable base and that base moving to the transfer part, ink can be supplied continuously to the vaporization part. This is possible because the ink contains almost no binder resin. Therefore, because vaporization parts involved in recording can be repeatedly used many times, in contrast to the above-mentioned thermal transfer method wherein the ink sheet is disposable after one use only, this type of printer is advantageous from the resource-saving and environmental conservation points of view.

Also, because this kind of printer uses vaporization or ablation, recording can be performed without the ink layer and the body to be recorded on (printing paper) making contact with each other, and as a result at the time of the second printing or thereafter the kind of reverse transfer and color mixing of ink seen with the thermal transfer system described above do not occur, the only parts heated are in the head including the vaporization parts, and compared to the above-mentioned thermal transfer system power consumption can be markedly reduced. At the same time, because small volume ink reservoirs and not the ink sheet described above are used to supply the ink, the printer can be made small and light.

Also, because this recording system uses ink vaporization or sublimation, it is not necessary to heat an ink-receiving layer of a body to be recorded on as in the thermal transfer method described above, nor is it necessary to press an ink sheet against a body to be recorded on with a high pressure, and in this point also the method is advantageous to downsizing and downweighting of the printer. Because the ink layer of the vaporization part and the body to be recorded on do not make contact with each other, not only is it impossible for thermal fusing to occur between them, but also recording is possible even when the compatibility of the ink and the receiving layer resin is poor. As a result, the freedom of design and selection of the ink and the receiving layer resin markedly widen.

Also, as a heat energy supply source for vaporizing (or subliming) the ink, the semiconductor lasers 18 are used as light sources, and because semiconductor lasers have high conversion efficiency from electrical power to light and also have excellent directivity and convergence, the efficiency with which they transmit heat energy to ink is very high. Therefore, compared to conventional types (the above-mentioned transfer by thermal head and ink jet, etc) they also have the merit that their energy use efficiency is markedly high and they are advantageous to miniaturization and power consumption reduction.

Also, although with conventional ink jet type color printers tonal expression is difficult, because control of output power and pulse width etc of semiconductor lasers is easy, with the recording method described above, multi-tonal expression can be easily realized. That is, it is possible to convert an electrical image made by a color video camera or the like into ink transfer according to an image signal with semiconductor lasers and form a full color image equal to a silver chloride photograph having at least 128 tones per color.

As a transfer body suitable for this ink vaporization recording method, it is preferable that the head 10 be amply able to withstand the heat applied instantaneously during transfer and have a structure wherein thin pillars 21 of for example several lm in size of which the surface area for supplying liquid ink spontaneously using the capillary phenomenon to the vaporization part (transfer part) is large and which can hold ink firmly even during transfer be provided. Also, by providing a heating device, it becomes possible to use an ink or ink mixture whose melting point is above room temperature.

As an ink suited to this recording method, any kind of ink which has a suitable vaporization rate or ablation rate, shows a fluid state at under 200° C. in a simple or mixed state, and has the necessary resistance to heat may be used. Specific examples include dispersion inks, oil-soluble inks, basic inks and acidic inks. In particular, when the ablation mechanism is more dominant than the vaporization mechanism, transfer is possible even with inks of high molecular weights and whose vaporization rates are low like direct inks and carbon black and pigments. Even with an ink whose melting point is above room temperature, by mixing inks or mixing an ink with a volatile low molecular weight substance, the melting point falls.

Also, as printing paper suited to this recording method, any kind of printing paper having a suitable affinity for the ink and which easily receives the ink and promotes the original coloring of the ink and has the action of fixing the ink may be used. For example, for use with a dispersion ink, a paper having its surface coated with polyester resin, polyvinylchloride resin, acetone resin or the like having good affinity with the dispersion ink is preferable. The fixing of ink transferred to the printing paper may alternatively be effected by a system wherein the image after transfer is heated and the ink on the surface is thereby caused to permeate into the receiving layer.

Heating means of ink transfer systems can be generally divided into methods using thermal heads and methods which combine laser light and a material which shows absorption in a wavelength region including the laser light wavelength region and converts light energy into heat energy (a photo-thermal convertor).

When laser light is used, there are the merits that the resolution increases markedly and by making the laser light density large with an optical system concentrated heating becomes possible and the arrival temperature rises and as a result the thermal efficiency increases. In particular, by using a multilaser, the time taken to transfer one picture is greatly reduced.

However, the photo-thermal convertor must be one which is heat-resistant enough to continuously absorb the light energy of the laser light. Therefore, as a photo-thermal convertor used in this method, besides directly providing the transfer part with a thin film light-absorbing body such as a metallic thin film showing absorption coinciding with the wavelength of the light emitted by the lasers or a two-layer film of a metallic thin film and a ceramic thin film having a high dielectric constant, materials or inks with good resistance to heat like fine particle type light absorbers such as carbon black or metal fine particles, organic inks or organic metallic inks such as phthalocyanine inks, naphthalocyanine inks, cyanine inks, anthraquinone inks uniformly dispersed in an ink may alternatively be used.

The present inventors discovered that when performing heat transfer by the ink-vaporizing recording method described above, when impurities other than ink components and necessary additives (antioxidants, radical inhibitors, infrared absorbers, plasticizers or melting point lowering agents or the like) are included in the recording substance which is the transfer coloring material, these kinds of impurity sometimes do not vaporize or ablate and remain on the transfer part of the transfer body as solids, and this kind of solid causes clogging of the transfer body, sensitivity decrease and reduction in tonal reproducibility are seen, and in some cases it becomes impossible to obtain a high quality image.

As a result of sampling and analyzing this kind of solid, it was found that this residual solid is [1] thermal decomposition products of ink or necessary additives, [2] thermal decomposition products of substances other than ink or necessary additives, [3] nonvolatile substances other than ink or necessary additives.

SUMMARY OF THE INVENTION

An object of this invention is to provide a recording substance with which while exploiting the merits of the above-mentioned thermal transfer method it is possible to avoid the influence of impurities which are not transferred and remain in the transfer part and always obtain high quality recording with excellent sensitivity and tonal reproducibility and a manufacturing method therefor and a recording method and a recording apparatus using this recording substance.

The present inventors arrived at the present invention by ascertaining that in the recording method described above, in order to prevent the occurrence of residual impurities (residual solids) produced on the head it is only necessary to reduce the concentration of impurities in the recording substance, and specifically, when the amount of impurities included in the recording substance other than ink components and necessary additives (these are the above-mentioned infrared ray absorbers and the like) is sufficiently reduced by suitable refining means and the concentration of these impurities is made 2 wt % or less of the recording substance, the rate at which the solid is produced is markedly suppressed.

That is, this invention pertains to a recording substance supplied to transfer to a body to be recorded on and effect prescribed recording on this body to be recorded on containing less than 2 wt % of residual impurities which do not transfer to the body to be recorded on during recording and remain after recording.

In the invention, the amount of residual impurities in the recording substance should be made 2 wt % or less, but usually in a recording substance it is desirable that including impurities which vaporize as impurities 5 wt % or less of impurities are included, and because residual impurities account for less than about 20% of the overall amount of impurities, to better achieve the objects of the invention it is preferable that the amount of residual impurities in the recording substance be made 1 wt % or less.

The above-mentioned residual impurities (residual solids) included in a recording substance according to the invention almost all originate in impurities in the ink, and specifically are as follows:

(1) When inorganic salts or organic metallic salts (these tend to mix in as ions when an ink is being made by salting out) such as NaCl, $Na_2CO_3$, $MgCl_2$ exist in the ink they act as a catalyst of a thermal decomposition reaction of the ink and decomposition products of the ink accumulate in the vaporization part and are further heated and become carbides and remain in the vaporization part.

(2) When impurities which do not volatilize even at over 400° C. exist in the ink (these tend to occur as ink intermediates during ink production), generally, after an ink which vaporizes or ablates at under 400° C. has been transferred, impurities remain and become solids.

(3) When impurities which decompose at a high rate at below 300° C. exist in the ink (these tend to mix in as oligomers and nitrogen oxide produced by nitrogen compounds decomposing at 300 to 400° C. in the ink production process), thermal decomposition products of the impurities accumulate in the vaporization part and are further heated and become carbides and remain in the vaporization part.

Particularly because the above-mentioned inorganic salts and/or organic metallic salts included as impurities act as catalysts, if the amount thereof contained in the recording substance is made less than 0.5 wt % (or further, less than 0.2 wt %) the thermal decomposition reaction rate decreases markedly.

Also, it was found that when the amount of the above-mentioned nonvolatile substances contained in the ink is less than 1 wt %, they are transferred to the body to be recorded on at the same time as the recording substance. For quantitative evaluation of these nonvolatile substances a differential thermal balance method is suitable; substances of which the weight reduction at 400° C. is lmg or less when 10 mg of the impurity is heated with a differential thermal balance at a rate of 10K/minute accumulate on the head as residual solids during transfer and will be called nonvolatile substances.

Also, it was found that when the amount of the above-mentioned substances which decompose at low temperatures contained in the recording substance is less than 1 wt %, the thermal decomposition products are also transferred to the body to be recorded on at the same time as the recording substance. For quantitative evaluation of these substances which decompose at low temperatures a differential thermal balance method is suitable; substances of which there is more than 1 mg of weight reduction and heat production accompanying weight reduction occurs at below 300° C. when 10 mg is heated with a differential thermal balance at a rate of 10K/minute accumulate on the head as residual solids during transfer and will be called substances which decompose at low temperatures.

A recording substance according to this invention preferably is a for example liquid recording substance facing a body to be recorded across a gap and by vaporization or ablation induced by heat applied according to recording information flies across the gap to the body to be recorded on, of which residual impurities consist of substances other than ink components and necessary additives.

Also, the invention provides as a manufacturing method for obtaining a recording substance according to the invention a method (that is, a refining method) for refining a synthesized crude recording substance using column chromatography, distillation, sublimation refining, solvent extraction, zone melting, recrystallization, ultrafiltration or reverse osmosis, or a combination of 2 or more of these methods and thereby removing the above-mentioned residual impurities (residual solids) contained in the synthesized crude recording substance until they become less than 2 wt %.

Judgment of the purity of a recording substance refined in this way can be suitably performed by common chemical analysis methods such as the NMR method, the IR method, gas chromatography, mass spectrometry or the TLC method.

Also, this invention provides a recording method wherein a recording substance according to the invention is heated according to recording information and made to transfer to a body to be recorded on.

In this recording method, it is preferable that a liquid recording substance is made to face a body to be recorded on across a gap and the recording substance is made to fly to the body to be recorded on by vaporization or ablation.

Also, it is preferable that the recording substance be heated by irradiation with laser light and for example a liquid recording substance be continuously supplied to a vaporization or ablation part. In this way, it is possible to form an image having density gradation on the body to be recorded on.

Further, the invention also provides a recording apparatus for practicing a recording method according to the invention having a recording substance holding part for holding a recording substance according to the invention.

In this case, the recording apparatus may be constituted as a head, and it is also possible to constitute it as a printer incorporating a head and further having body to be recorded on supporting means for making a body to be recorded on face the recording substance holding part and heating means for heating the recording substance and making it transfer to the body to be recorded on.

The invention is well-suited to a recording head for the above-mentioned non-contact type ink-vaporizing printer so constituted that it is made to transfer (especially fly) to the body to be recorded on across a gap. However, it can also be applied to a recording head for the above-mentioned contact type thermal transfer printer (thermal head or the like).

DETAILED DESCRIPTION OF THE PREFERRED EMBODIMENTS

A preferred preferred embodiment of the invention will now be described with reference to the accompanying drawings. The invention is of course not limited to the preferred embodiment below only.

First, with reference to FIG. 4 to FIG. 7, the outline constitution of a non-contact type ink-vaporizing laser beam printer (for example a video printer having a serial type head) according to the invention will be described.

In this ink-vaporizing laser beam printer (and also similarly with the above-mentioned thermal transfer type printer), to carry out multicolor printing, for example 3 sets (4 sets when one for black is separately provided) of printer head parts are provided and these head parts are miniaturized and brought together to form a head part for multicolor printing.

Figure 3:
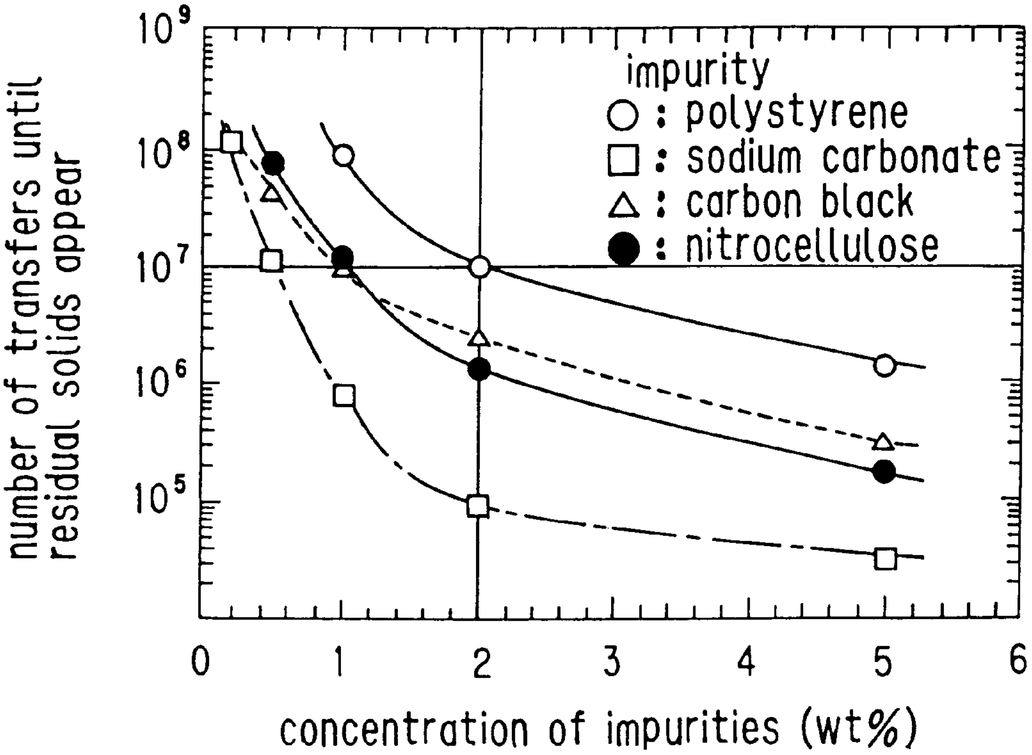
FIG. 3 is a graph showing comparatively for an ink based on the invention the variation of transfer performance with on the amount of impurities contained.
Figure 4:
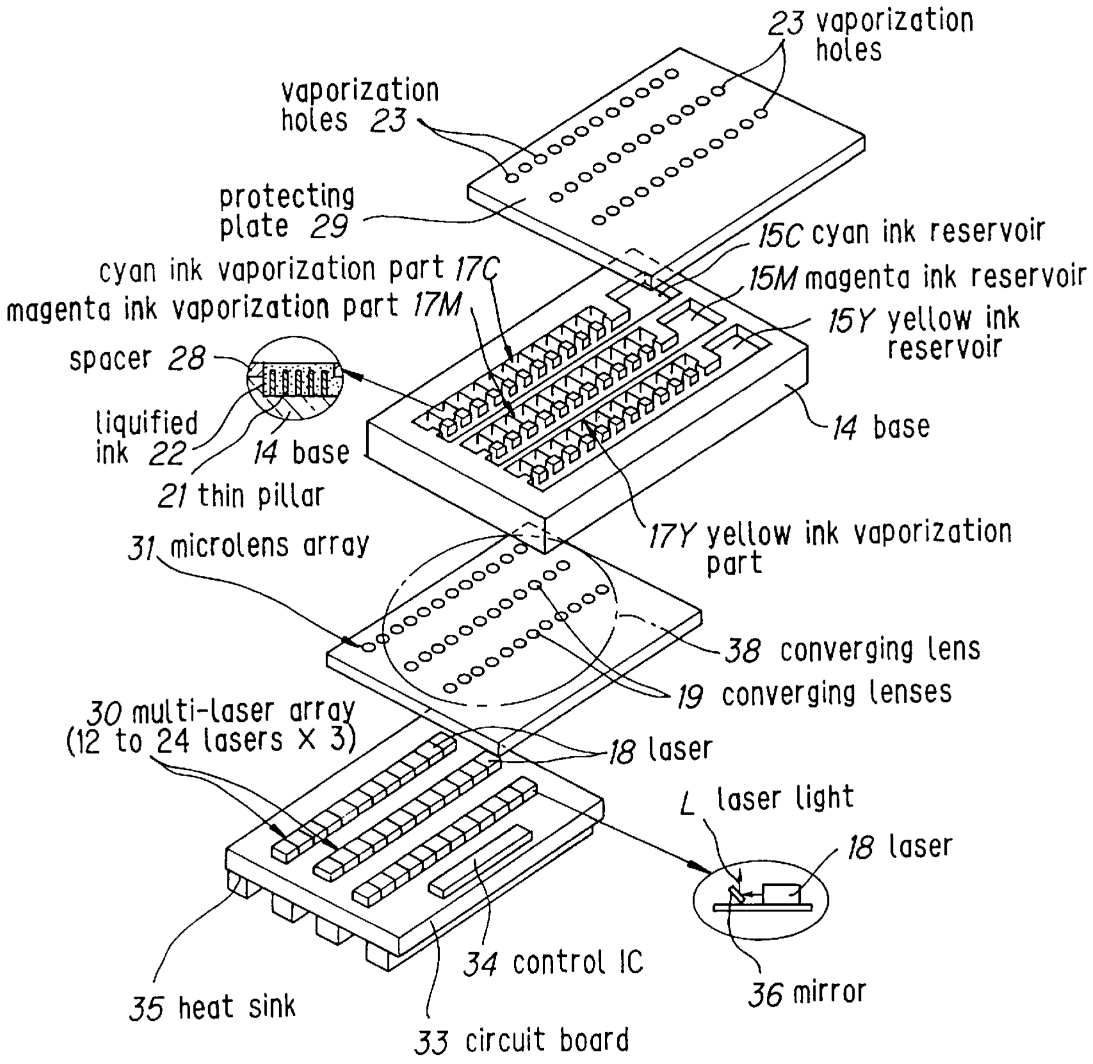
FIG. 4 is an exploded perspective view of a printer head according to a preferred embodiment of the invention.
Figure 5:
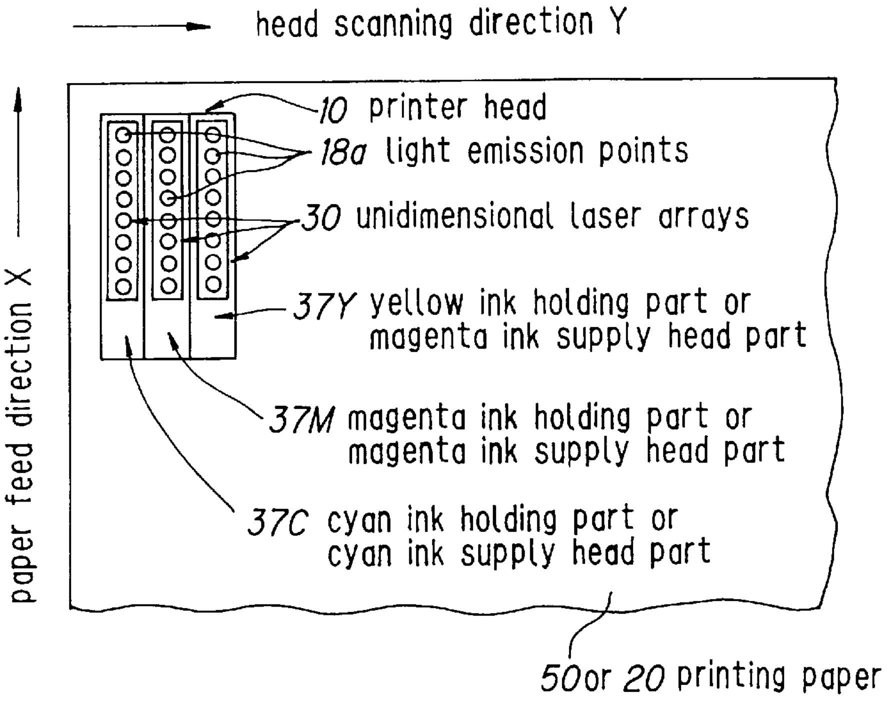
FIG. 5 is a schematic rear view showing a printer head according to the same preferred embodiment and its scan state.

That is, as shown in FIGS. 5, 3 unidimensional laser arrays for the colors are provided lined up in a head scan direction Y. Specifically, as shown clearly in FIG. 4, for example for full-color use cyan, magenta, yellow ink reservoirs 15C, 15M, 15Y are severally provided in a base 14 constituting ink holding parts or ink supply head parts 37C, 37M, 37Y, and ink of the colors is supplied to rows of vaporization parts 17C, 17M, 17Y forming 12 to 24 dots.

Laser beams emitted by a multi-laser array 30 consisting of twelve to twenty-four lasers (especially semiconductor laser chips) 18 disposed in an array are severally focused by a microlens array 31 of multiple converging lenses 19 into the vaporization parts (36 is a mirror for guiding laser light L through a right angle).

As the converging lenses, the lens system shown in the drawing may be used, but alternatively a single large-diameter converging lens 38 shown with a broken line may be used. This lens 38 is so formed that its refraction path so varies according to the light incidence position that the light exiting position corresponds to the above-mentioned vaporization parts 17Y, 17M and 17C. The multi-laser array 30 is driven and controlled by a control IC 34 mounted on the circuit board 33 and is amply cooled by a heat sink 35.

Figure 6:
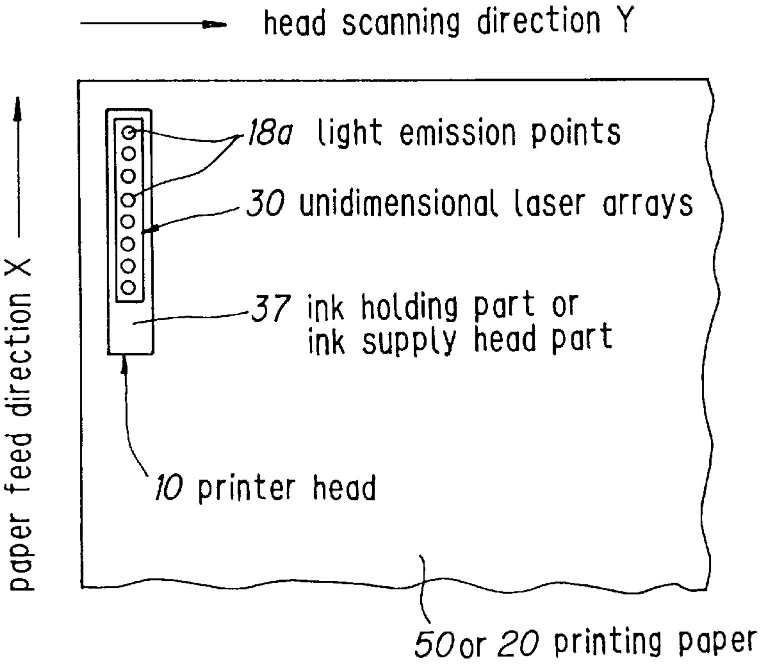
FIG. 6 is a schematic rear view showing a similar scan state of another printer head.

In the case of monocolor printing, as shown in FIG. 6, by making a unidimensional laser array 30 and adopting a structure such that the respective laser elements can be operated independently and in parallel, a printing speed of one or more times the number of beams can be simply obtained (for example if a laser array of 24 beams is used, 24 times the speed is obtained).

In both the printer heads 10 mentioned above, in the ink holding part 37 liquefied ink 22 is stored in dot form in correspondence with the number of recording dots, and the lasers 18 are also disposed in the form of an array having the recording dot number of light emission points 18*a*. Even in a thermal transfer type printer which does not use lasers 18, the heating part of the thermal head 1 is similarly arrayed in dot form.

The printer described above performs printing by paper feeding in the vertical direction (X direction) and scan of the head in the horizontal direction (Y direction) orthogonal to the X direction, and the vertical direction paper feeding and horizontal direction head scan are carried out alternately.

Figure 7:
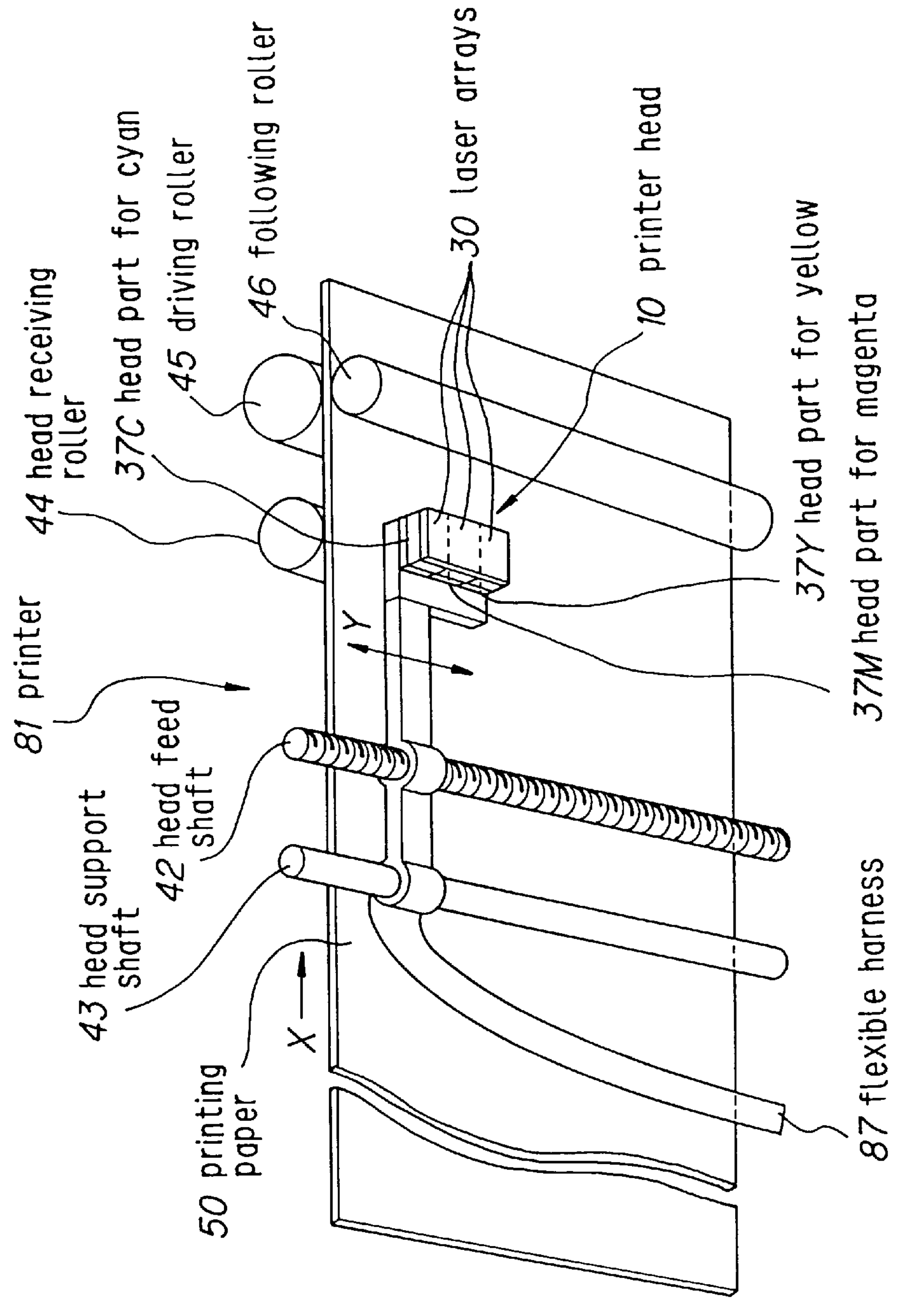
FIG. 7 is a schematic perspective view of the same printer seen from below.

In the printer 81 of this example, as shown in FIG. 7, the printer head 10 for example for multicolor printing is mounted movably back and forth in a head feed direction Y orthogonal to the printing paper 50 paper feed direction X by a head feed shaft 42 consisting of a feed screw mechanism and a head support shaft 43.

A head receiving roller 44 for so supporting the printing paper 50 as to pinch it is rotatably mounted above the head 10.The printing paper 50 is pinched between and fed in the paper feed direction X by a paper feed driving roller 45 and a following roller 46.

The head 10 is severally connected to a head drive circuit board (not shown in the drawings) or the like by way of a flexible harness 87. The structure itself of the printer head 10 is basically the same as that shown in FIG. 2.

Figure 8:
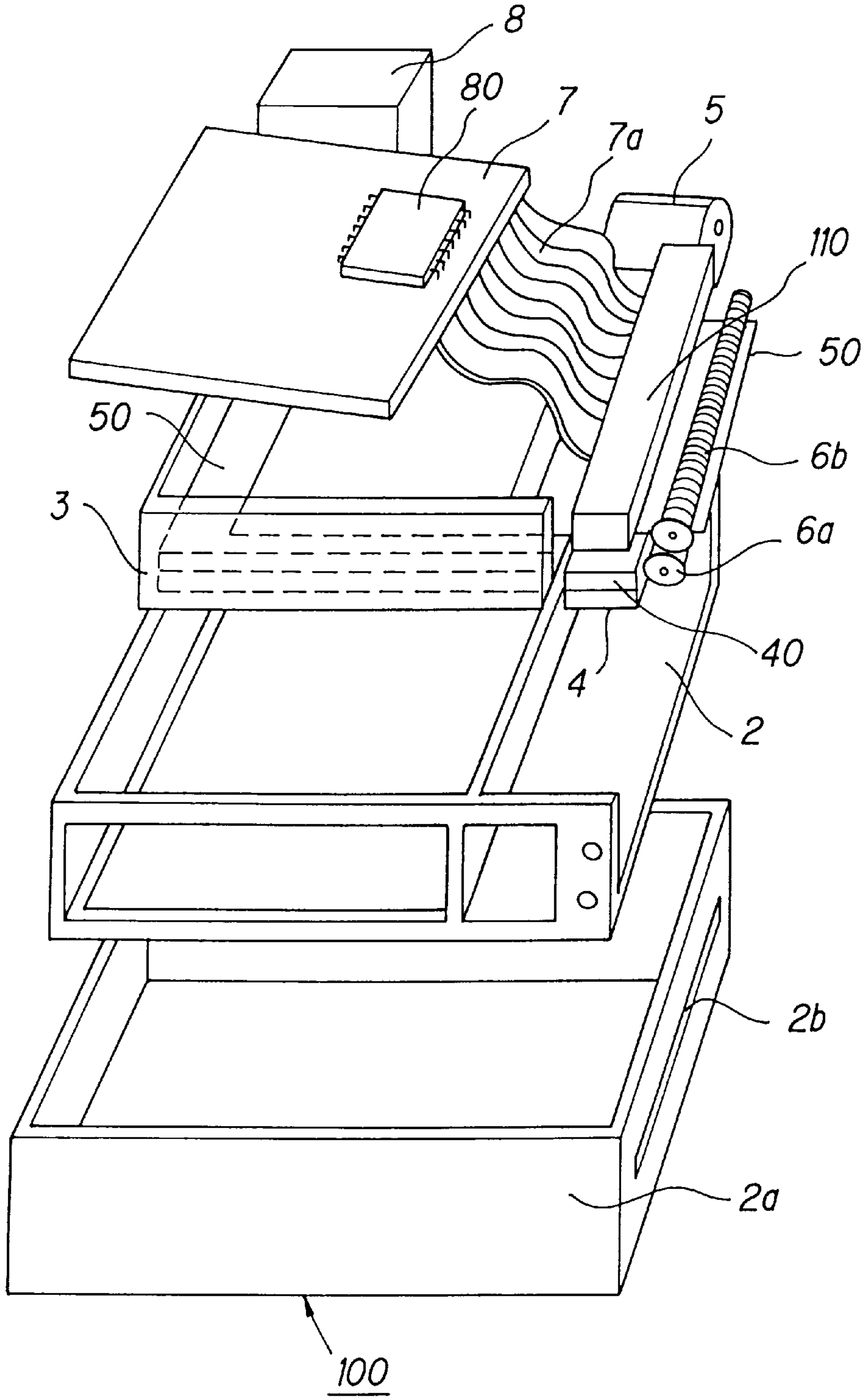
FIG. 8 is an exploded perspective view of another printer.

FIG. 8 shows a laser vaporization type color video printer (laser vaporization printer) 100 having a line type head, and a cassette 3 into which is put paper to be recorded on 50 and a flat base 4 for recording are provided on a frame chassis 2 covered by a box 2*a*.

A paper feed drive roller 6*a* driven by a motor 5 or the like is mounted and a pressure following roller 6*b* which pinches the paper to be recorded on 50 with a light pressure between itself and the paper feed drive roller 6*a* is mounted on the discharge opening 2*b* side of the inside of the box 2*a*. A head drive circuit board 7 on which is mounted a drive IC 80 and a DC power supply 8 are provided above the cassette 3 inside the box 2*a*. The head drive circuit board 7 and the head part (recording part) 10 disposed above the flat base 4 are connected by a flexible harness 7*a*.

The head part 40 has solid ink receiving tanks (indicated by the general reference numeral 110) for receiving for example yellow (Y), magenta (M) and cyan (C) vaporizing inks of solid powder form, and in the same way as described above liquefied ink can be selectively laser-heated and transferred onto the paper to be recorded on 50.

With the printer heads 10, 40 and the laser beam printers 81, 100 using these printer heads and also the recording method using these, because the ink 22 is transferred by being heated by laser light L from the lasers 18 and vaporized and made to fly to the paper to be recorded on 50, the same effects can be obtained as those discussed in connection with the non-contact type ink-vaporizing laser beam printer described above.

The contained amounts of impurities, that is, residual impurities or residual solids, other than ink components and necessary additives (antioxidants, radical inhibitors, infrared absorbers, plasticizers or melting point lowering agents or the like) in an ink to be vaporized in using the above-mentioned printer 81 or 100 or the head 10 or 40 according to the invention were variously changed and respective corresponding transfer performances were measured as shown in the examples below.

Example 1

Figure 1:
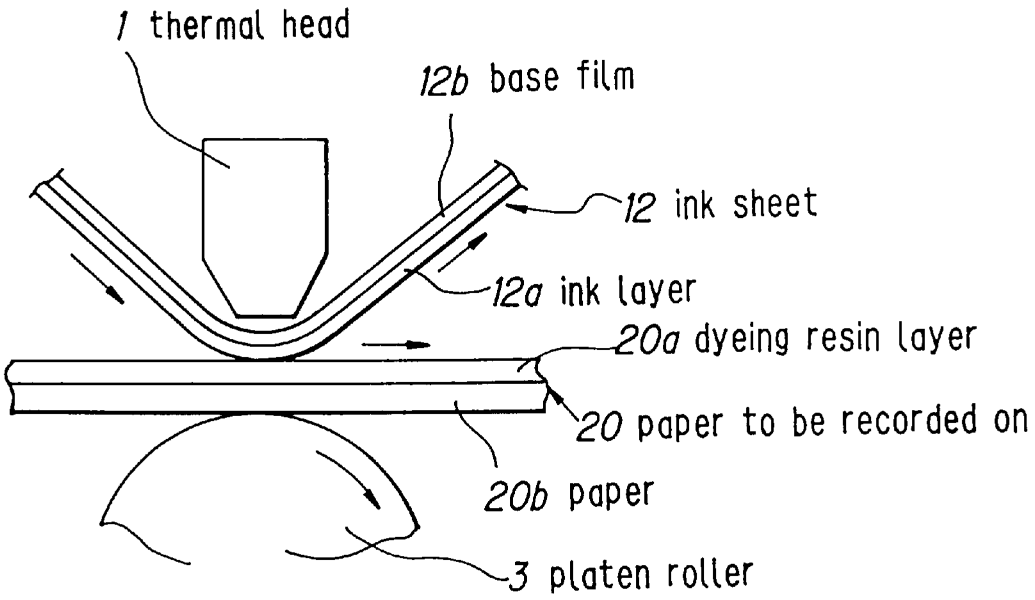
FIG. 1 is a front view of a detail of a printer using a conventional thermosensitive recording head.
Figure 2:
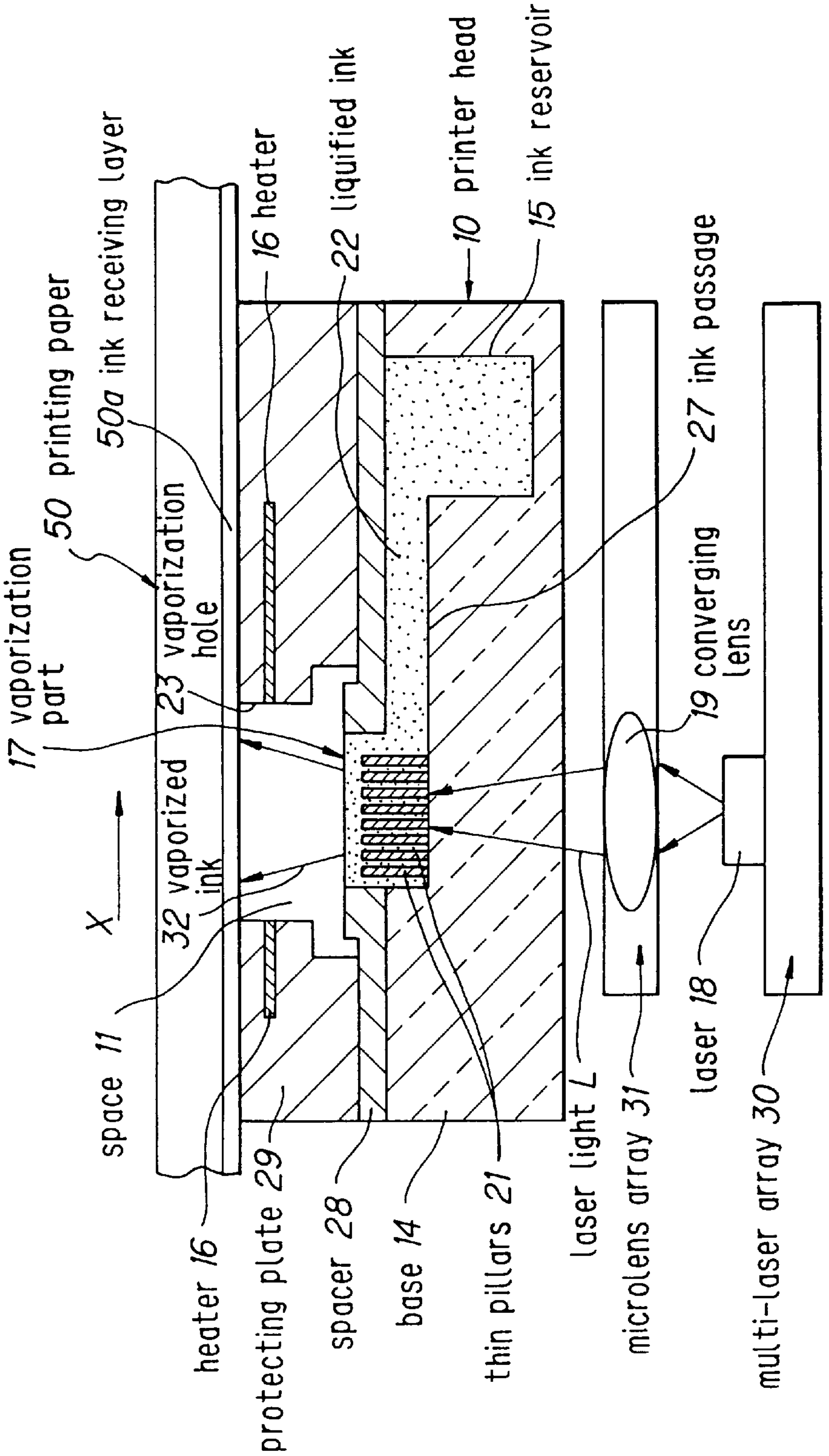
FIG. 2 is a schematic sectional view of a printer proposed before the completion of the invention.
Figure 9:
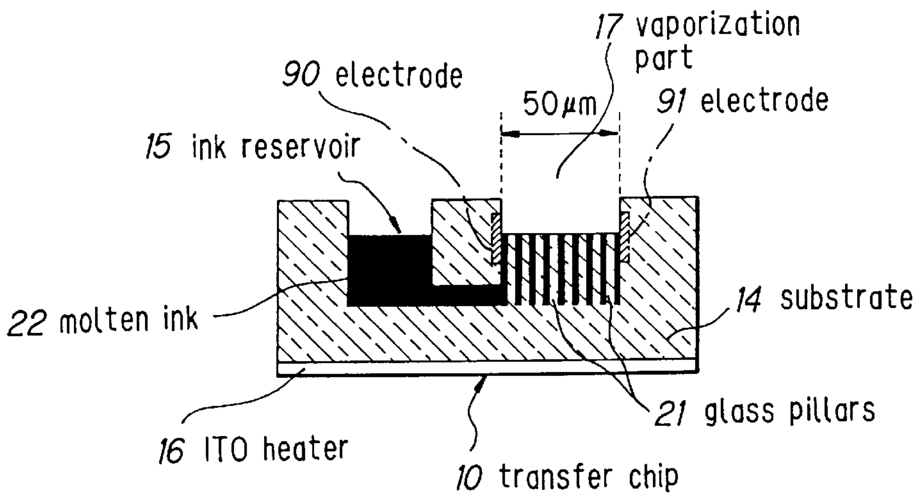
FIG. 9 is a schematic sectional view of a transfer chip (printer head)

The head used was basically the same as that shown in FIG. 6 and FIG. 2, but in practice was as shown in FIG. 9. That is, on a transparent substrate 14 made of Pyrex glass, by combining ordinary semiconductor lithography technology and reactive ion etching technology, a transfer chip (head) having a structure with 10×10 glass thin pillars 21 of diameter 2 μm, height 10 μm, spacing 2 μm erected on the vaporization part 17 was made. Also, by depositing a metal from above, as shown by dotted lines electrodes 90, 91 for resistance heating of the vaporization part 17 can be provided, but here a heating system based on laser light (see FIG. 10, which will be further discussed later) was adopted. ITO (Indium Tin Oxide) was deposited on the rear surface of the substrate 14 as a heater 16 for melting the ink.

For example, for an A6 size printing paper to have a resolution of 300 DPI, approximately 1400×1000 pixels are necessary. Therefore, if a transfer chip (head) having 1400 transfer parts (vaporization parts) is used, to form one As size image, one transfer part in the transfer chip is driven for about 1000 pixels' worth. To perform A6 size printing of 10,000 sheets with one transfer chip, the transfer parts in the transfer chip must have transfer reliability enough for 10 million ($10^7$)pixels. That is, the transfer parts in the transfer chip must have a performance such that solids such as carbides do not accumulate on the transfer parts even when they carry out 10 million transfer operations. For all impurities, at least $10^5$ transfers are necessary.

The relationships between impurity concentration and the number of transfers until solids insoluble in a solvent appear in the vaporization part when as a typical impurity polystyrene oligomer (average molecular weight: 2000), as an inorganic salt sodium carbonate, as a nonvolatile substance carbon black and as a substance which decomposes at low temperatures nitrocellulose oligomer (average molecular weight: 4000) were severally added to an ink (disperse red 15, purity: 99.8%) are shown in FIG. 3.

Figure 10:
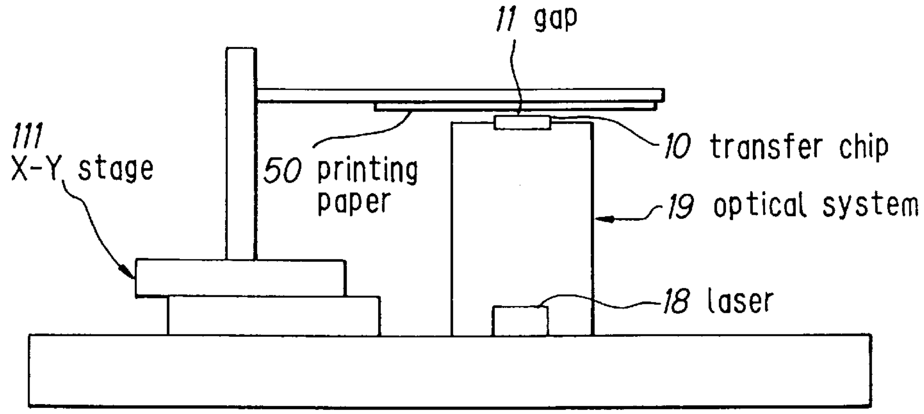
FIG. 10 is a schematic view of a transfer test apparatus.

From these results it was found that when the impurity concentration is less than 2 wt % (especially when as an impurity the inorganic salt is less than 0.5 wt %, when the nonvolatile substance is less than 1 wt % and when the substance which decomposes at low temperatures is less than 1 wt %), the ink had the performance that even when the transfer part performed 10 million transfer operations solids insoluble in a solvent did not accumulate on the transfer part (see FIG. 10, which will be further discussed later, for the transfer method).

That is, when the impurity concentration is less than 2 wt % based on this invention, the number of transfers until residual solids arise is at least $10^5$ for all of the impurities (however, with the inorganic salt this was over $10^5$, with the nonvolatile substance and the substance which decomposes at low temperatures it was over $10^6$, and with the polystyrene oligomer it was over $10^7$; to make it over $10^7$, it is preferable that all the impurities be brought into the ranges mentioned above); however, when the impurity concentration is above 2 wt %, the number of transfers until residual solids arise becomes less than $10^5$ transfers, and it becomes impossible to secure $10^5$ transfers for all the impurities.

In this way, by using an ink based on this invention, while exploiting the advantages of the above-mentioned non-contact ink-vaporizing thermal transfer, it is possible to avoid influences from impurities which are not transferred and remain and even increasing the number of transfers always obtain high quality recording without head clogging or sensitivity reduction or reduction in tonal reproducibility.

Example 2

In this example, a cyan ink used was refined in the following way: As an adsorbent, silica gel dispersed in toluene was packed to a height of 100 cm into a column of diameter 5 cm and height 120 cm, and a solution of 1 g of a commercial available cyan oil-soluble ink: Solvent Blue −35 (Aldrich Co., melting point 123° C.) Disolved in 9 g of toluene was introduced into the top of the column and development was carried out by an ordinary method.

As a result, a black component remained in the upper part of the column. The remaining component was a polymerized ink intermediary (a nonvolatile substance) 50 mg and was 5 wt % of the ink, and the results of a differential thermal balance analysis were that there was no weight reduction whatsoever up to 400° C. The ink component was treated in an evaporator and the solvent removed. The ink yield was 89%, its melting point had increased by 1° C., and the residual solids thereof were 1 wt %.

A transfer chip (head) into which this cyan ink was put was the same as that shown in FIG. 9. Using this head, transfer operation was carried out in the following way:

An ink was made by mixing as an infrared absorbing ink naphthalocyanine ink TS-1 (Mitsui Toatsu Co., Ltd.) whose maximum absorption wavelength is in the vicinity of 780 nm with the following composition into the Solvent Blue −35 refined as described above and completely dispersing it at 150° C. with an ultrasonic disperser.

| | |
|---|---|
| refined cyan ink | 100 weight parts |
| naphthalocyanine ink | 2 weight parts |

When this ink in a solid state was introduced into an ink reservoir 15 of a transfer chip 10 and the temperature of the transfer body was brought to 150° C. by heating being carried out by a current being passed through the ITO 16, the ink melted and was spontaneously introduced into the vaporization part 17 by the capillary effect.

The transfer chip with the ink 22 therein was installed in the transfer apparatus shown in FIG. 10.That is, a paper to be recorded on 50 made by coating a 61 μm polyester receiving layer onto a 180 μm synthetic paper was installed in a transfer apparatus facing a transfer body 10 with a 50 μm gap 11 provided, and while this was moved at a relative speed of 4 cm/sec by means of an X–Y stage 111, a pulse laser light L having a wavelength of 780 nm, lms irradiation, 1 ms interval obtained from a semiconductor laser 18 (SLD 203: Sony Co., Ltd.) was focused into the transfer part of the transfer body by a focusing lens system 19. The size of the laser light in the ink layer in the vaporization part was 5×10 μm, and the output at the transfer body surface was 30 mW.

In this way, a spot of 90 μm in diameter was transferred to the paper to be recorded on 50 every one pulse. When the optical density of a so-called solid image formed from continuous spots was measured with a macbeth density meter, it reached 2.2. This pulse was irradiated repeatedly 10 million times, but no solids appeared in the transfer part whatsoever.

Comparison Example 1

When a transfer test was carried out by the same method as Example 2 using cyan oil-soluble ink: Solvent Blue –35 without refining it (the residual component is 5 wt %), when irradiation with a 1 ms laser pulse was repeated 200,000 times, a solid appeared on the transfer part. This solid was insoluble in organic solvents such as acetone and toluene. Also, when the solid was analyzed by XPS (X-ray pulse spectrum), it was found to be carbon (carbide).

Example 3

Figure 11:
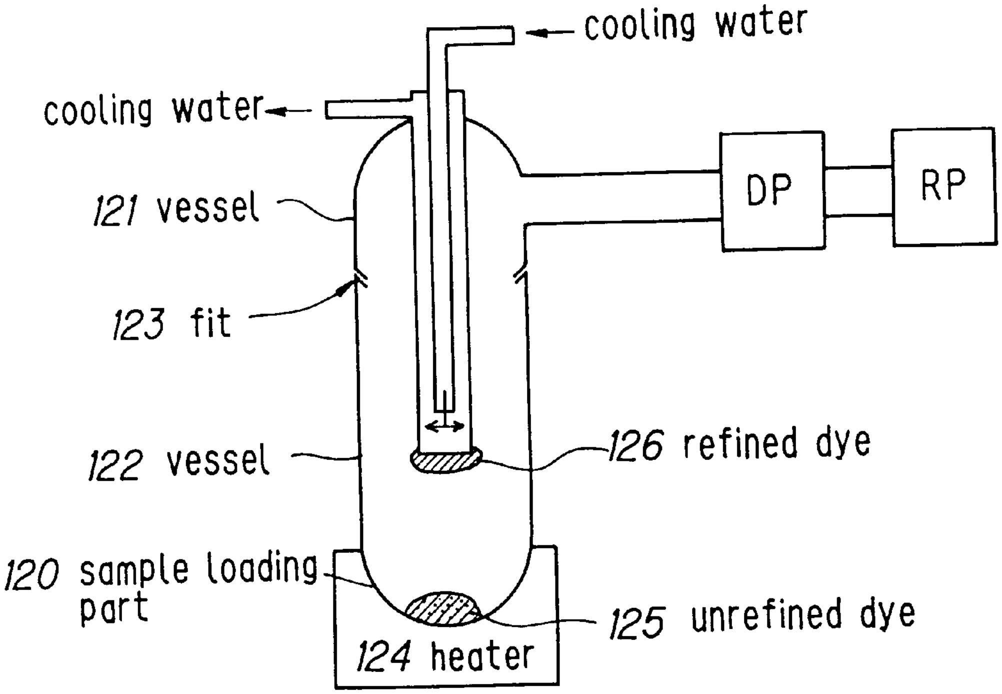
FIG. 11 is a schematic sectional view of an ink sublimation refining apparatus.

1 g of a cyan dispersion ink: ESC –655 (Sumitomo Chemicals Co., Ltd., melting point 149° C.) was loaded into a sublimation refining apparatus shown in FIG. 11, and after the pressure inside the apparatus was reduced to $2\times10^{-6}$ Torr with an oil diffusion pump DP and a rotary pump RP the sample loading part 120 was held at 140° C. for four hours with a heater 124. In this refining apparatus, upper and lower vessels 121 and 122 are joined by a ground joint 123, but if the upper vessel 121 is removed it is possible to introduce unrefined ink 125 onto the loading part 120 through the opening in the top of the lower vessel 122. The inside of the vessel is held at a fixed temperature by cooling water.

As a result of refining with this refining apparatus, 20 mg of a black organic-solvent-insoluble component (organic metallic salt including Cu, Co, arising from the catalyst at the time of ink synthesis) remained. Copper and cobalt were included in the residue. The melting point of the recovered ink 126 was the same as it was before the refining, and the residual solid thereof was 0.4 wt %.

When a transfer test was carried out by the same method as Example 2 using the ink thus obtained, even when irradiation with a lms pulse was repeated 10 million times, no solid whatsoever appeared in the transfer part.

Comparison Example 2

When a transfer test was carried out by the same method as Example 2 using cyan dispersion ink: ESC –655 without refining it (the residual component is 2 wt %), when irradiation with a 1 ms laser pulse was repeated 80,000 times, a solid appeared in the transfer part. This solid was insoluble in organic solvents such as acetone and toluene. Also, when the solid was analyzed by XPS (X-ray pulse spectrum), it was found to be carbon (carbide).

Example 4

3 g of a magenta dispersion ink: HSR –2031 (Mitsubishi Chemicals Co., Ltd., melting point 123° C.) was dissolved in 27 g of toluene and put in a separating funnel, ion exchange water 50 g was further added, and after shaking well the organic layer was taken out and the solvent was removed with an evaporator. Small quantities of metallic ions were present in the water layer. Because the freezing point depression constant of this HSR –2031 was 15.2 and when the molecular weight of the impurity was measured with a mass spectrometer it was 296, the impurity was calculated to be 5.8 wt %.

Next, a primary refined ink was packed into a quartz pipe of diameter 5 mm, length 20 cm, and removal of impurities was carried out by repeating zone melting three times. The melting point of the recovered ink was 3° C. higher than before the refining, and the residual solid thereof was 0.5 wt %.

When a transfer test was carried out by the same method as Example 2 using the ink thus obtained, even when irradiation with a lms pulse was repeated 10 million times, no solid whatsoever appeared in the transfer part.

Comparison Example 3

When a transfer test was carried out by the same method as Example 2 using magenta dispersion ink: HSR –2031 without refining it (the residual component is 5.8 wt %), when irradiation with a lms laser pulse was repeated 20,000 times, a solid appeared in the transfer part. This solid was insoluble in organic solvents such as acetone and toluene.

Preferred embodiments of the invention are described above, but the above preferred embodiments can be further changed based on the technological concept of the invention.

For example, the invention is not limited to the ink vaporization transfer system described above, the above-mentioned transfer system based on ablation is also possible, and in either case the ink or recording substance transfers by flying. Also, methods other than those described above may be employed as the recording substance refining method.

As the energy for vaporizing or ablating the recording substance such as an ink, a heating beam other than laser light can be used, or other heating methods such as resistance heating may be used. For this it is possible to add a conductive substance to the recording substance or to provide the above-mentioned thin pillars which have a capillary action with a resistive film for resistive heating. Any suitable heating method can be employed to produce density gradation.

Also, the number of recording substance holding parts for holding a recording substance (ink) and the number of dots, and the number of beams (the number of light emission points) of the laser arrays corresponding thereto may be variously changed, and their array shape and size also are not limited to those described above.

Also, the structures and shapes of the head and printer may be made suitable structures and shapes other than those mentioned above, and other suitable materials may be used for the materials of the parts constituting the head. Concerning the recording inks also, besides using the three colors magenta, yellow and cyan (further, with black added) for full-color recording, two-color printing, one-color mono-color or black and white recording can be carried out.

Concerning the printer, the invention is not limited to the above-mentioned non-contact type and can also be applied to the above-mentioned thermal transfer type printers (these may be line type or serial type). However, in this case, a signal for selecting the colors is fed to the dots of the thermal head.

Also, besides once making a solid ink into liquid form and performing recording by vaporizing this, as in the above example, it is possible to perform recording by directly vaporizing (i.e. subliming) a solid ink by heating it with laser light, and it is also possible to hold a liquefied ink (liquid at room temperature) in an ink reservoir. Furthermore, it is possible to cause the recording substance to transfer to the printing paper by phenomena other than the above-mentioned flying (for example evaporation), and in this sense the recording need not be the above-mentioned non-contact type. Also, unlike the printers described above, recording may be carried out on a paper to be recorded on positioned below the head by irradiation with laser light from above the head.

In this invention, as described above, because in a recording substance supplied to transfer to a body to be recorded on and effect prescribed recording on this body to be recorded the content of residual impurities which do not transfer to the body to be recorded on and remain after the recording is made less than 2 wt %, it is possible to prevent the occurrence of residual impurities (residual solids) produced on the head during recording, and it is possible to avoid the influences of those residual impurities and always obtain high quality recording with excellent sensitivity and tonal reproducibility.

What is claimed is:

1. A printing ink composition for heating and subsequent transference to a printable material via one of vaporization and ablation, the composition comprising:

ink;

ink additives; and solid residual impurities comprised of non-volatile substances in an amount of 1 wt % or less, the non-volatile substances having weight reduction at 400° C. of 1 mg or less when 10 mg of the non-volatile substance is heated with a differential thermal balance at a rate of 10 K/minute.

2. A printing ink composition for heating and subsequent transference to a printable material via one of vaporization and ablation, the composition comprising:

ink;

ink additives; and solid residual impurities comprised of low temperature decomposing substances in an amount of 1 wt % or less, the low temperature decomposing substances having more than 1 mg of weight reduction below 300° C. when 10 mg of the low temperature decomposing substance is heated with a differential thermal balance at a rate of 10 K/minute.

* * * * *